(12) United States Patent  
Li et al.

(10) Patent No.: US 9,871,677 B2
(45) Date of Patent: Jan. 16, 2018

(54) DATA PROCESSING METHOD AND APPARATUS

(71) Applicant: Huawei Technologies Co., Ltd., Shenzhen (CN)

(72) Inventors: Zhijun Li, Beijing (CN); Tongtong Wang, Beijing (CN); Changsong Li, Shenzhen (CN); Wenbin Yang, Beijing (CN); Zhiqiang Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 80 days.

(21) Appl. No.: 15/200,930

(22) Filed: Jul. 1, 2016

(65) Prior Publication Data

US 2016/0315788 A1    Oct. 27, 2016

Related U.S. Application Data

(63) Continuation of application No. PCT/CN2014/070093, filed on Jan. 3, 2014.

(51) Int. Cl.
*H04L 12/64* (2006.01)
*H04N 19/172* (2014.01)
(Continued)

(52) U.S. Cl.
CPC ........ *H04L 12/6418* (2013.01); *H04L 7/0008* (2013.01); *H04L 25/03872* (2013.01);
(Continued)

(58) Field of Classification Search
None
See application file for complete search history.

(56) References Cited

U.S. PATENT DOCUMENTS 7,826,495 B2    11/2010    Deng et al.
8,572,300 B2 *  10/2013    Wu ..................... G06F 13/4291
                                                        370/464

(Continued)

FOREIGN PATENT DOCUMENTS

CN      1691666 A    11/2005
CN    101335687 A    12/2008
(Continued)

OTHER PUBLICATIONS

Law et al., "100GE and 40GE PCS and MLD Proposal," IEEE P802.3ba 40Gb/s and 100Gb/s Ethernet Task Force, Portland, Oregon, pp. 1-24, Institute of Electrical and Electronics Engineers, New York, New York (Jan. 2008).

(Continued)

*Primary Examiner* — Hong Cho
(74) *Attorney, Agent, or Firm* — Leydig, Voit & Mayer, Ltd.

(57) ABSTRACT

Embodiments of the present invention provide a data processing method and apparatus, including: receiving X data streams through X physical lanes of an Ethernet interface, converting the X data streams into M data streams transmitted on M virtual lanes, and performing bandwidth adjustment on each data stream of the M data streams to obtain M first data streams; receiving Y data streams through Y physical lanes of the Ethernet interface, converting the Y data streams into N data streams transmitted on N virtual lanes, and performing bandwidth adjustment on each data stream of the N data streams to obtain N second data streams. In addition, a corresponding apparatus is further provided. By using the foregoing technical solution, received data streams of different sources and different frequencies can be processed.

12 Claims, 7 Drawing Sheets

(51) Int. Cl.
*H04L 7/00* (2006.01)
*H04L 25/03* (2006.01)
*H04L 29/06* (2006.01)
*H04L 25/14* (2006.01)
*H04L 12/801* (2013.01)

(52) U.S. Cl.
CPC .............. *H04L 25/14* (2013.01); *H04L 69/22* (2013.01); *H04N 19/172* (2014.11); *H04L 47/10* (2013.01); *H04L 2012/6454* (2013.01)

(56) References Cited

U.S. PATENT DOCUMENTS

| | | | |
|---|---|---|---|
| 9,331,962 B2* | 5/2016 | Lida | H04L 12/2832 |
| 2003/0053493 A1* | 3/2003 | Graham Mobley | H04N 21/6118 370/538 |
| 2008/0138075 A1 | 6/2008 | Gustlin et al. | |
| 2011/0013690 A1 | 1/2011 | Kobayashi et al. | |
| 2011/0255552 A1 | 10/2011 | Ellegard | |
| 2012/0320915 A1* | 12/2012 | Barrass | H04L 47/10 370/389 |
| 2014/0177652 A1 | 6/2014 | Su et al. | |

FOREIGN PATENT DOCUMENTS

| | | |
|---|---|---|
| CN | 101447975 A | 6/2009 |
| CN | 102439995 A | 5/2012 |
| CN | 103299586 A | 9/2013 |

OTHER PUBLICATIONS

Shafai, "Technical Feasibility of 100G/40G MLD," IEEE P802.3ba 40Gb/s and 100Gb/s Ethernet Task Force, Orlando, Florida, pp. 1-15, Institute of Electrical and Electronics Engineers, New York, New York (Mar. 2008).

Trowbridge, "40GbE and 100GbE PCS Considerations," IEEE 802.3 Higher Speed Study Group, Seoul, South Korea, pp. 1-34, Institute of Electrical and Electronics Engineers, New York, New York (Sep. 2007).

* cited by examiner

Before a third operation

After the third operation

AM header

DATA PROCESSING METHOD AND APPARATUS

CROSS-REFERENCE TO RELATED APPLICATIONS

This application is a continuation of International Application No. PCT/CN2014/070093, filed on Jan. 3, 2014, which is hereby incorporated by reference in its entirety.

TECHNICAL FIELD

Embodiments of the present invention relate to the field of communications technologies, and in particular, to a data processing method and apparatus.

BACKGROUND

On a conventional Ethernet, a receiver of a receiving apparatus receives, through an Ethernet interface, data that is sent by a sender of a sending apparatus through an Ethernet interface. The receiving apparatus may be a router. The sending apparatus may also be a router. Specifically, the Ethernet interface of the sender may send P data streams through P physical lanes (physical lane, PL for short), where P is a positive integer. The P physical lanes may correspond to P serializers/deserializers (serializer/deserializer, serdes for short). The sender drives, by using a clock, the Ethernet interface of the sender to send the P data streams. After receiving the P data streams through the P physical lanes, the receiver needs to process the P data streams on the P physical lanes by using a clock, for example, processing the P data streams by using a clock data recovery (clock data recovery, CDR for short) circuit. The processed P data streams have a same frequency. Further, the receiving apparatus performs subsequent processing on the processed P data streams. Data streams received by the receiver are sent by a same sender (namely, a same source) through an Ethernet interface under driving of a same clock (namely, a same frequency), and the foregoing data streams may be referred to as single-source intra-frequency data streams.

With development of Ethernet technologies, there may be data streams of different sources and different frequencies. That is, different senders separately drive different Ethernet interfaces by using different clocks to send data streams. How to process data streams that are sent by different senders (different sources) and use different clocks (different frequencies) is a problem that need to be solved.

SUMMARY

According to a data processing method and apparatus provided by embodiments of the present invention, received data streams of different sources and different frequencies can be processed, which helps further process processed data streams.

According to a first aspect, a data processing method is provided, including:

receiving X data streams through X physical lanes of an Ethernet interface, where the X data streams are sent by a first sender under driving of a first clock, the X physical lanes are in a one-to-one correspondence with the X data streams, and X is a positive integer;

converting the X data streams into M data streams transmitted on M virtual lanes, where the M data streams are in a one-to-one correspondence with the M virtual lanes, and M is a positive integer;

performing bandwidth adjustment on each data stream of the M data streams to obtain M first data streams, where the M first data streams are in a one-to-one correspondence with the M data streams, and bandwidth of each first data stream of the M first data streams is greater than bandwidth of a data stream of the corresponding M data streams;

receiving Y data streams through Y physical lanes of the Ethernet interface, where any physical lane of the X physical lanes is different from any physical lane of the Y physical lanes, the Y data streams are sent by a second sender under driving of a second clock, the Y physical lanes are in a one-to-one correspondence with the Y data streams, Y is a positive integer, a nominal working frequency of the first clock is equal to a nominal working frequency of the second clock, and an actual working frequency of the first clock is not equal to an actual working frequency of the second clock;

converting the Y data streams into N data streams transmitted on N virtual lanes, where the N data streams are in a one-to-one correspondence with the N virtual lanes, and both each data stream of the M data streams and each data stream of the N data stream include an alignment mark AM and a data block group, where the AM is an immediate previous data block of the data block group, a quantity of bits included in the data block group is equal to a positive integer multiple of a quantity of bits included in the AM, and N is a positive integer; and performing bandwidth adjustment on each data stream of the N data streams to obtain N second data streams, where the N second data streams are in a one-to-one correspondence with the N data streams, the M first data streams and the N second data streams are transmitted under driving of a third clock, and bandwidth of each second data stream of the N second data streams is greater than bandwidth of a data stream of the corresponding N data streams.

In a first possible implementation manner of the first aspect, after the performing bandwidth adjustment on each data stream of the M data streams to obtain M first data streams, the method further includes:

performing a first operation on each first data stream of the M first data streams to obtain M third data streams, where the M third data streams are in a one-to-one correspondence with the M first data streams, an AM header of each third data stream is a header of data of the third data stream, where the data is transmitted in a one clock cycle under the driving of the third clock, and the AM header of each third data stream is an AM of a corresponding first data stream or a data subblock in an AM of a corresponding first data stream, where the data subblock includes a least significant bit LSB of an AM; and after the performing bandwidth adjustment on each data stream of the N data streams to obtain N second data streams, the method further includes:

performing a second operation on each second data stream of the N second data streams to obtain N fourth data streams, where the N fourth data streams are in a one-to-one correspondence with the N second data streams, an AM header of each fourth data stream is a header of data of the fourth data stream, where the data is transmitted in one clock cycle under the driving of the third clock, and the AM header of each fourth data stream is an AM of a corresponding second data stream or a data subblock in an AM of a corresponding second data stream, where the data subblock includes an LSB of the AM.

With reference to the first possible implementation manner of the first aspect, in a second possible implementation manner of the first aspect, after the performing a first operation on each first data stream of the M second data streams to obtain M third data streams, the method further includes:

performing a third operation on the M third data streams to obtain M fifth data streams, where M AM headers of the M fifth data streams are aligned; and after the performing a second operation on each second data stream of the N second data streams to obtain N fourth data streams, the method further includes:

performing a fourth operation on the N fourth data streams to obtain N sixth data streams, where N AM headers of the N sixth data streams are aligned.

With reference to the second possible implementation manner of the first aspect, in a third possible implementation manner of the first aspect, after the performing a third operation on the M third data streams to obtain M fifth data streams, the method further includes:

performing a fifth operation on the M fifth data streams to obtain M seventh data streams, where data block groups in the M seventh data streams are aligned; and after the performing a fourth operation on the N fourth data streams to obtain N sixth data streams, the method further includes:

performing a sixth operation on the N sixth data streams to obtain N eighth data streams, where data block groups in the N eighth data streams are aligned.

With reference to the third possible implementation manner of the first aspect, in a fourth possible implementation manner of the first aspect, after the performing a fifth operation on the M fifth data streams to obtain M seventh data streams, the method further includes:

performing descrambling on the M seventh data streams to obtain a first Ethernet frame flow; and after the performing a sixth operation on the N sixth data streams to obtain N eighth data streams, the method further includes:

performing descrambling on the N eighth data streams to obtain a second Ethernet frame flow.

With reference to the fourth possible implementation manner of the first aspect, in a fifth possible implementation manner of the first aspect, the method further includes:

under driving of a clock signal sent by the third clock, converging the first Ethernet frame flow and the second Ethernet frame flow to obtain an Ethernet frame flow.

According to a second aspect, a data processing apparatus is provided, including:

a first receiving unit, configured to receive X data streams through X physical lanes of an Ethernet interface, where the X data streams are sent by a first sender under driving of a first clock, the X physical lanes are in a one-to-one correspondence with the X data streams, and X is a positive integer;

a first conversion unit, configured to convert the X data streams received by the first receiving unit into M data streams transmitted on M virtual lanes, where the M data streams are in a one-to-one correspondence with the M virtual lanes, and M is a positive integer;

a first adjustment unit, configured to perform bandwidth adjustment on each data stream of the M data streams obtained by the first conversion unit to obtain M first data streams, where the M first data streams are in a one-to-one correspondence with the M data streams, and bandwidth of each first data stream of the M first data streams is greater than bandwidth of a data stream of the corresponding M data streams;

a second receiving unit, configured to receive Y data streams through Y physical lanes of the Ethernet interface, where any physical lane of the X physical lanes is different from any physical lane of the Y physical lanes, the Y data streams are sent by a second sender under driving of a second clock, the Y physical lanes are in a one-to-one correspondence with the Y data streams, Y is a positive integer, a nominal working frequency of the first clock is equal to a nominal working frequency of the second clock, and an actual working frequency of the first clock is not equal to an actual working frequency of the second clock;

a second conversion unit, configured to convert the Y data streams received by the second receiving unit into N data streams transmitted on N virtual lanes, where the N data streams are in a one-to-one correspondence with the N virtual lanes, and both each data stream of the M data streams and each data stream of the N data stream include an alignment mark AM and a data block group, where the AM is an immediate previous data block of the data block group, a quantity of bits included in the data block group is equal to a positive integer multiple of a quantity of bits included in the AM, and N is a positive integer; and a second adjustment unit, configured to perform bandwidth adjustment on each data stream of the N data streams obtained by the second conversion unit to obtain N second data streams, where the N second data streams are in a one-to-one correspondence with the N data streams, the M first data streams and the N second data streams are transmitted under driving of a third clock, and bandwidth of each second data stream of the N second data streams is greater than bandwidth of a data stream of the corresponding N data streams.

In a first possible implementation manner of the second aspect, the apparatus further includes:

a first unit, configured to perform a first operation on each first data stream of the M first data streams obtained by the first adjustment unit to obtain M third data streams, where the M third data streams are in a one-to-one correspondence with the M first data streams, an AM header of each third data stream is a header of data of the third data stream, where the data is transmitted in one clock cycle under the driving of the third clock, and the AM header of each third data stream is an AM of a corresponding first data stream or a data subblock in an AM of a corresponding first data stream, where the data subblock includes a least significant bit LSB of an AM; and a second unit, configured to perform a second operation on each second data stream of the N second data streams obtained by the second adjustment unit to obtain N fourth data streams, where the N fourth data streams are in a one-to-one correspondence with the N second data streams, an AM header of each fourth data stream is a header of data of the fourth data stream, where the data is transmitted in one clock cycle under the driving of the third clock, and the AM header of each fourth data stream is an AM of a corresponding second data stream or a data subblock in an AM of a corresponding second data stream, where the data subblock includes a least significant bit LSB of the AM.

With reference to the first possible implementation manner of the second aspect, in a second possible implementation manner of the second aspect, the apparatus further includes:

a third unit, configured to perform a third operation on the M third data streams obtained by the first unit to obtain M fifth data streams, where M AM headers of the M fifth data streams are aligned; and a fourth unit, configured to perform a fourth operation on the N fourth data streams obtained by the second unit to obtain N sixth data streams, where N AM headers of the N sixth data streams are aligned.

With reference to the second possible implementation manner of the second aspect, in a third possible implementation manner of the second aspect, the apparatus further includes:

a fifth unit, configured to perform a fifth operation on the M fifth data streams obtained by the third unit to obtain M seventh data streams, where data block groups in the M seventh data streams are aligned; and a sixth unit, configured to perform a sixth operation on the N sixth data streams obtained by the fourth unit to obtain N eighth data streams, where data block groups in the N eighth data streams are aligned.

With reference to the third possible implementation manner of the second aspect, in a fourth possible implementation manner of the second aspect, the apparatus further includes:

a seventh unit, configured to perform descrambling on the M seventh data streams obtained by the fifth unit to obtain a first Ethernet frame flow; and an eighth unit, configured to perform descrambling on the N eighth data streams obtained by the sixth unit to obtain a second Ethernet frame flow.

With reference to the fourth possible implementation manner of the second aspect, in a fifth possible implementation manner of the second aspect, the apparatus further includes:

a ninth unit, configured to: under driving of a clock signal sent by the third clock, converge the first Ethernet frame flow generated by the seventh unit and the second Ethernet frame flow generated by the eighth unit to obtain an Ethernet frame flow.

A receiver may receive data streams of different sources and different frequencies. If the receiver processes the data streams of different sources according to the prior art, it cannot be ensured that the processed data streams are located in a same clock domain. Because the data streams of different sources are located in different clock domains, new data streams obtained by the receiver by using a CDR circuit to separately process the data streams of different sources and different frequencies are also located in different clock domains, and it is difficult for the receiver to perform further processing, for example, descrambling, on the new data streams located in different clock domains. According to the method provided by the embodiments of the present invention, after a receiver maps a plurality of data streams that is of different sources and received from physical lanes to a plurality of data streams on virtual lanes, the receiver adds padding data to each data stream of the plurality of data streams on the virtual lanes, so that the data streams are transmitted under driving of a same clock. According to the method provided by the embodiments of the present invention, the receiver can generate a plurality of data streams located in a same clock domain. In this way, the receiver can conveniently perform subsequent processing on the plurality of data streams located in the same clock domain.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall in the protection scope of the present invention.

The following describes some terms involved in the embodiments of the present invention:

Physical layer circuit (physical layer, PHY for short): The PHY may be implemented by using a field programmable gate array (field programmable gate array, FPGA for short) or an application specific integrated circuit (application specific integrated circuit, ASIC for short). The PHY may include a serdes, a bit demultiplexer (bit demultiplexer, bit demux for short), a first in first out buffer (first in first out buffer, FIFO buffer for short), a descrambling circuit, and a convergence circuit. The PHY may be a component of a network interface card (network interface card, NIC for short), where the NIC may be a line card (line card, LC for short) or a physical interface card (physical interface card, PIC for short). The PHY may be connected to a media access controller (media access controller, MAC for short) by using a media independent interface (media independence interface, MII for short).

PHY chip (PHY chip): The PHY chip may include one PHY or a plurality of PHYs. The PHY chip may be implemented by using an FPGA or an ASIC.

MAC: The MAC may be implemented by using an FPGA or an ASIC. The MAC may include a reconciliation sublayer circuit (reconciliation sublayer, RS for short) and a cyclic redundancy code (cyclic redundancy code, CRC for short) calculation circuit.

MAC chip (MAC chip): The MAC chip may include one MAC or a plurality of MACs. The MAC chip may be implemented by using an FPGA or an ASIC.

System on chip: The system on chip may include one MAC and one PHY. The system on chip may also include a plurality of MACs and a plurality of PHYs. The PHY in the system on chip may be coupled with the MAC in the system on chip. The system on chip may be implemented by using an FPGA or an ASIC.

Multiport Ethernet device: The multiport Ethernet device may be an Ethernet hub, an Ethernet router, or an Ethernet switch. The multiport Ethernet device includes a plurality of ports, and each port may include a PHY and a MAC.

Figure 1:
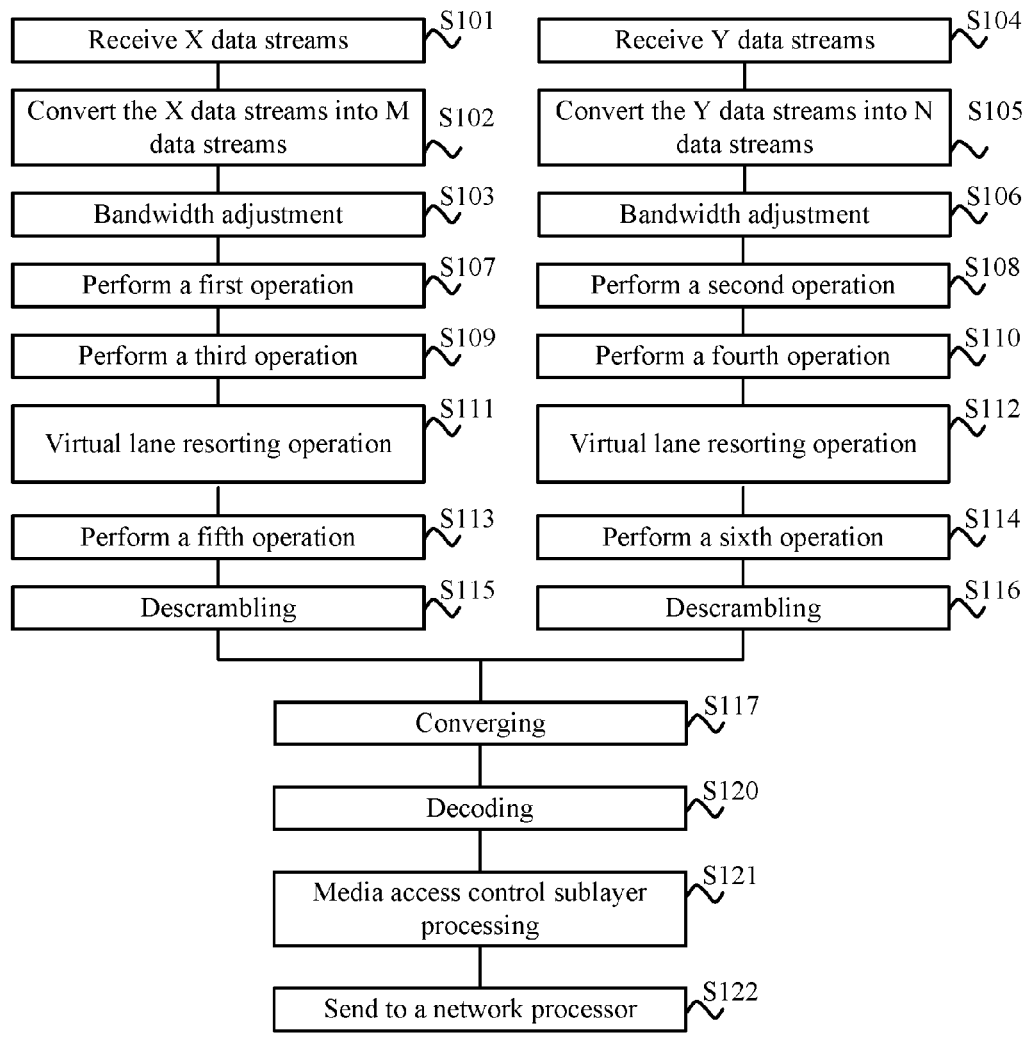
FIG. 1 is a schematic flowchart of a data processing method according to an embodiment of the present invention.

FIG. 1 is a schematic flowchart of a data processing method according to an embodiment of the present invention. The method may be executed by a PHY, a PHY chip, a system on chip or a multiport Ethernet device.

S101. Receive X data streams through X physical lanes of an Ethernet interface, where the X data streams are sent by a first sender under driving of a first clock, the X physical lanes are in a one-to-one correspondence with the X data streams, and X is a positive integer.

For example, X may be equal to 1.

S102. Convert the X data streams into M data streams transmitted on M virtual lanes (virtual lane, VL for short), where the M data streams are in a one-to-one correspondence with the M virtual lanes, and M is a positive integer.

For example, M may be equal to 1.

S103. Perform bandwidth adjustment on each data stream of the M data streams to obtain M first data streams, where the M first data streams are in a one-to-one correspondence with the M data streams, and bandwidth of each first data stream of the M first data streams is greater than bandwidth of a data stream of the corresponding M data streams.

S104. Receive Y data streams through Y physical lanes of the Ethernet interface, where the Y data streams are sent by a second sender under driving of a second clock, the Y physical lanes are in a one-to-one correspondence with the Y data streams, Y is a positive integer, a nominal (nominal) working frequency of the first clock is equal to a nominal working frequency of the second clock, and an actual working frequency of the first clock is not equal to an actual working frequency of the second clock.

For example, Y may be equal to 1.

S105. Convert the Y data streams into N data streams transmitted on N virtual lanes, where the N data streams are in a one-to-one correspondence with the N virtual lanes, and both each data stream of the M data streams and each data stream of the N data streams include an alignment marker (alignment marker, AM for short) and a data block group, where the AM is an immediate previous (immediate previous) data block of the data block group, a quantity of bits included in the data block group is equal to a positive integer multiple of a quantity of bits included in the AM, and both M and N are positive integers.

For example, N may be equal to 1.

For example, a quantity of bits included in each data block in the data block group is equal to the quantity of bits included in the AM. In addition, the AM is also a data block.

The following describes a data block in a data stream. Each data block in the data stream is obtained by performing physical layer coding on an Ethernet frame flow. The physical layer coding may be 8 bit/10 bit coding, or may be 64 bit/66 bit coding. When the physical layer coding is 8 bit/10 bit coding, a quantity of bits included in one data block is 10. When the physical layer coding is 64 bit/66 bit coding, a quantity of bits included in one data block is 66. In a 10-bit data block, two bits may be a synchronization header. In a 66-bit data block, two bits may be a synchronization header. Unless otherwise specified, the data block in this embodiment of the present invention refers to a data block excluding a synchronization header. For example, the 64-bit data block in this embodiment of the present invention refers to a data block excluding a synchronization header. In addition, after a data block is generated, the data block needs to be distributed to a virtual lane. In one clock cycle, one data block may be distributed to a virtual lane, or two data blocks may be distributed to a virtual lane. Therefore, for one virtual lane, a quantity of bits of data transmitted in one clock cycle is equal to 128. Because the quantity of bits of the data transmitted in one clock cycle is equal to a quantity of bits of one data block, a quantity of bits of a data block transmitted on the virtual lane may be 128. The AM is a type of data block. Therefore, a quantity of bits of an AM transmitted on the virtual lane may also be 128.

After physical layer coding is performed on the Ethernet frame flow, an AM is inserted periodically. This cycle may be referred to as a data cycle. For example, according to a 100 Gigabit Ethernet (gigabit ethernet, GE for short) standard in the Institute of Electrical and Electronics Engineers (Institute of Electrical and Electronics Engineers, IEEE for short) 802.3ba, data transmitted in one data cycle may be 16384 data blocks. The 16384 data blocks include an AM and 16383 data blocks. The AM is transmitted before the 16383 data blocks. A quantity of bits included in each data block of the 16384 data blocks is 64. That is, in common cases, data transmitted in one data cycle includes one AM and a plurality of data blocks, where the plurality of data blocks forms a data block group. In other words, after an AM is inserted, data blocks, except the AM, in the data transmitted in one data cycle are data blocks in the data block group. In the data transmitted in one data cycle, a quantity of bits included in each data block of the plurality of data blocks is equal to a quantity of bits included in the AM.

S106. Perform bandwidth adjustment on each data stream of the N data streams to obtain N second data streams, where the N second data streams are in a one-to-one correspondence with the N data streams, the M first data streams and the N second data streams are transmitted under driving of a third clock, and bandwidth of each second data stream of the N second data streams is greater than bandwidth of a data stream of the corresponding N data streams.

According to the method shown in FIG. 1, M first data streams and N second data streams that are located in a same clock domain can be generated. Therefore, subsequent processing can be conveniently performed on the M first data streams and the N second data streams that are located in the same clock domain.

In S103, the performing bandwidth adjustment on each data stream of the M data streams to obtain M first data streams may be implemented by adjusting a frequency and/or a bit width. Bandwidth of a data stream is related to a frequency of a driving clock of the data stream, and is also related to a bit width of the data stream. Specifically, the bandwidth of the data stream meets formula 1.1:

$$B = F * b \qquad \text{formula 1.1}$$

where B represents the bandwidth of the data stream, F represents the frequency of the driving clock of the data stream, and b represents the bit width of the data stream. Similarly, for S106, the performing bandwidth adjustment on each data stream of the N data streams to obtain N second data streams may also be implemented by adjusting a frequency and/or a bit width.

The bandwidth adjustment may be implemented by performing a write operation and a read operation on a FIFO buffer. Using the M data streams in S103 as an example, the M data streams may be separately written into M FIFO buffers, and then a read operation is performed on the M FIFO buffers, where the M FIFO buffers are in a one-to-one correspondence with the M data streams. A frequency at which a write operation is performed on the M FIFO buffers may be a frequency of the first clock, and a frequency at which a read operation is performed on the M FIFO buffers may be a frequency of the third clock. A data bit width for performing a read operation on a FIFO buffer may be greater than a data bit width for performing a write operation on the FIFO buffer. If the bandwidth adjustment is implemented by adjusting only the frequency, but not adjusting the bit width, the frequency of the third clock is greater than the frequency of the first clock. If the bandwidth adjustment is implemented by adjusting both the frequency and the bit width, the frequency of the third clock may be less than or equal to the frequency of the first clock. In this case, bandwidth for reading the FIFO buffer is greater than bandwidth for writing into the FIFO buffer.

Similarly, for S106, the N data streams may also be separately written into N FIFO buffers, and then a read operation is performed on the N FIFO buffers. The N FIFO buffers are in a one-to-one correspondence with the N data streams. A frequency at which a write operation is performed on the N FIFO buffers may be a frequency of the second clock, and a frequency at which a read operation is performed on the N FIFO buffers may be a frequency of the third clock. If the bandwidth adjustment is implemented by adjusting only the frequency and the bit width remains unchanged, the frequency of the third clock is greater than the frequency of the first clock. If the bandwidth adjustment is implemented by adjusting both the frequency and the bit width, the frequency of the third clock may be less than or equal to the frequency of the first clock. In this case, bandwidth for reading the FIFO buffer is greater than bandwidth for writing into the FIFO buffer.

In a case in which bandwidth for reading a FIFO buffer is greater than bandwidth for writing into a FIFO buffer, when a read operation is performed on a FIFO buffer, an amount of data in the FIFO buffer cannot meet a requirement of reading data at the frequency of the third clock. In other words, in one clock cycle, an amount of data read at the frequency of the third clock is greater than an amount of data written at the frequency of the first clock. In this case, reading the FIFO buffer needs to be stopped, and padding data is used as data output by the FIFO buffer, so as to prevent underflow of the FIFO buffer. Using the padding data as the data output by the FIFO buffer is equivalent to adding the padding data to the read data. An amount of padding data that is added to data streams read in one clock cycle is equal to a quantity of bits of one AM. Data added with the padding data is a first data stream corresponding to the data streams written into the FIFO buffer.

In this way, the M first data streams and the N second data streams after S103 and S106 are performed are transmitted under the driving of the third clock, and bandwidth of a data stream after S103 and S106 are performed is greater than bandwidth of a data stream before S103 and S106 are performed.

In this embodiment of the present invention, a format of padding data added in S103 and S106 is not limited. When the padding data is inserted into a data stream, the padding data may be marked, so that the padding data is deleted subsequently.

Figure 2:
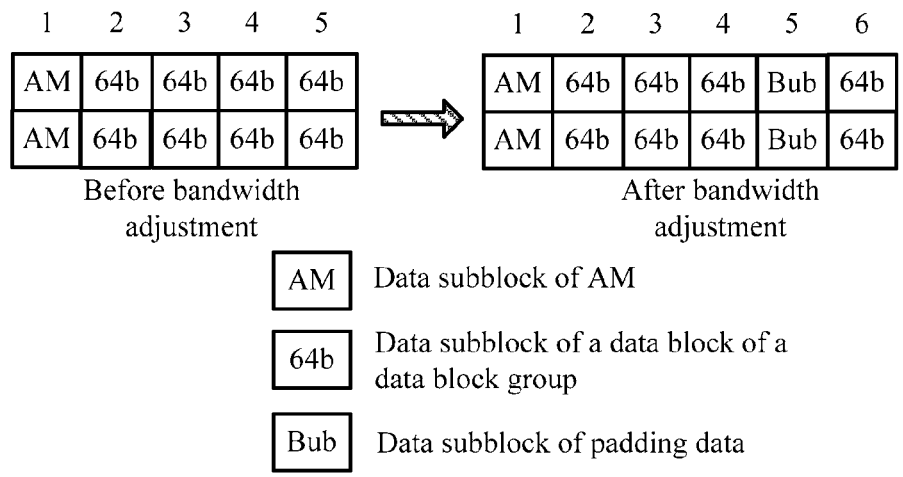
FIG. 2 is a schematic pattern diagram of data before and after bandwidth adjustment according to an embodiment of the present invention.

FIG. 2 is a schematic pattern diagram of data before and after bandwidth adjustment. A quantity of bits of a data block in FIG. 2 is 128.

As shown in FIG. 2, 1-5 represent five consecutive clock cycles, and 1-6 represent six consecutive clock cycles. A quantity of bits of a data block in each clock cycle is 2*64 bits (bit). The 64 bits herein refer to a data block excluding a 2-bit synchronization header. In FIG. 2, data in each cycle includes two data subblocks, and each small box represents a 64-bit data subblock. It can be seen from FIG. 2 that a complete AM includes 2*64 bits. A data block in the data block group also includes 2*64 bits. A quantity of bits of inserted padding data is equal to a quantity of bits of the AM data block, that is, 2*64 bits. Optionally, in the method shown in FIG. 1, S107 may be further performed after S103. S108 may be further performed after S106.

S107. Perform a first operation on each first data stream of the M first data streams to obtain M third data streams, where the M third data streams are in a one-to-one correspondence with the M first data streams, an AM header of each third data stream is a header of data of the third data stream, where the data is transmitted in one clock cycle under the driving of the third clock, and the AM header of each third data stream is an AM of a corresponding first data stream or a data subblock in an AM of a corresponding first data stream, where the data subblock includes a least significant bit (least significant bit, LSB for short) of the AM.

S108. Perform a second operation on each second data stream of the N second data streams to obtain N fourth data streams, where the N fourth data streams are in a one-to-one correspondence with the N second data streams, an AM header of each fourth data stream is a header of data of the fourth data stream, where the data is transmitted in one clock cycle under the driving of the third clock, and the AM header of each fourth data stream is an AM of a corresponding second data stream or a data subblock in an AM of a corresponding second data stream, where the data subblock includes an LSB of the AM.

For example, when the first operation is performed, the AM header may be first identified, and then the AM header is adjusted to a header of data transmitted in one clock cycle. That is, the first operation may include two operations: an operation of identifying the AM header and an operation of adjusting the AM header.

For example, when the second operation is performed, the AM header may be first identified, and then the AM header is adjusted to a header of data transmitted in one clock cycle. That is, the second operation may include two operations: an operation of identifying the AM header and an operation of adjusting the AM header.

Optionally, as another embodiment, the first operation may be performed before the padding data is added. That is, an AM header is first identified, and then the AM header is adjusted to a header of data transmitted in one clock cycle. Then, bandwidth of a data stream that undergoes the first operation is adjusted by increasing a frequency of the data stream that undergoes the first operation. In this case, if the bit width of the data stream is changed, data before the AM needs to be discarded, that is, data before the AM is not written into a FIFO buffer, but the AM is used as first data written into the FIFO buffer. If the bit width of the data stream remains unchanged, the data before the AM does not need to be discarded.

Optionally, as another embodiment, the second operation may be performed before the padding data is added. That is, an AM header is first identified, and then the AM header is adjusted to a header of data transmitted in one clock cycle. Then, bandwidth of a data stream that undergoes the second operation is adjusted by increasing a frequency of the data stream that undergoes the second operation. In this case, if the bit width of the data stream is changed, data before the AM needs to be discarded, that is, data before the AM is not written into a FIFO buffer, but the AM is used as first data written into the FIFO buffer. If the bit width of the data stream remains unchanged, the data before the AM does not need to be discarded.

A person of ordinary skill in the art can understand that a complete AM includes an LSB. When the AM is transmitted, the LSB in the AM is first transmitted. Therefore, an AM header includes an LSB of a corresponding AM. The AM header may be a complete AM, or may be a data subblock, which includes an LSB of an AM, in a complete AM. For example, a complete AM may be divided into K data subblocks, such as an AM_1 to an AM_K, where K is a positive integer greater than 2. The first AM subblock (namely, the AM_1) of the K AM subblocks includes an LSB. In this case, the AM_1 may be referred to as an AM header.

Figure 3:
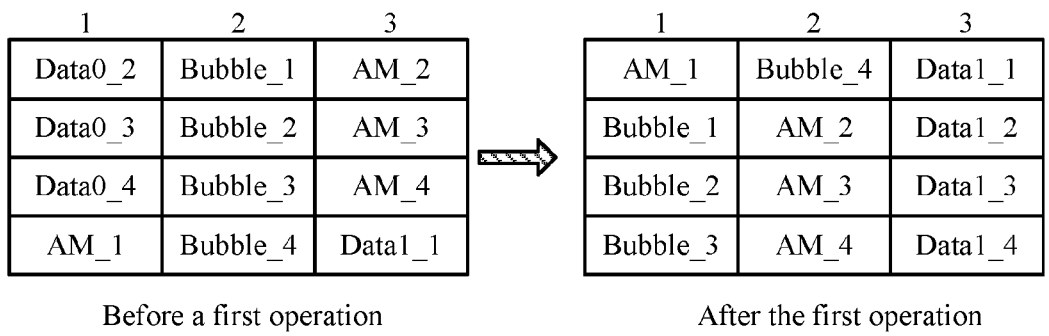
FIG. 3 is a schematic diagram of data before and after a first operation is performed according to an embodiment of the present invention.

FIG. 3 is a schematic diagram of data before and after a first operation is performed.

FIG. 3 shows a pattern of data transmitted in three consecutive clock cycles. As shown in FIG. 3, a complete AM is divided into four AM subblocks, namely, an AM_1 to an AM_4. A piece of complete padding data is divided into four pieces of padding subdata, namely, a Bubble_1 to a Bubble_4, and a complete data block in a data block group is divided into four data subblocks. That is, Data0 is divided into Data0_1 to Data0_4. Data1 is divided into Data1_1 to Data1_4. In the schematic diagram of data shown in FIG. 3, data in a leftmost box of the first row is a header of data transmitted in one clock cycle. As shown in FIG. 3, Data0_2 and Data0_4 are included before the first operation is performed. The Data0_2 to the Data0_4 are data subblocks of a data block in a previous data cycle. Data1_1 to Data1_4 are data subblocks of a data block in a current data cycle.

It can be seen from FIG. 3 that before the first operation is performed, data in a header position of data transmitted in one clock cycle is the Data0_2. After the first operation is performed, the AM_1 is in the header position of the data transmitted in one clock cycle.

A specific implementation of the second operation may be similar to a specific implementation of the first operation. For the second operation, refer to FIG. 3 and related descriptions of FIG. 3.

Optionally, in the method shown in FIG. 1, S109 may be further performed after S107. S110 may be further performed after S108.

S109. Perform a third operation on the M third data streams to obtain M fifth data streams, where M AM headers of the M fifth data streams are aligned.

Specifically, alignment of the AM headers means that LSBs in the AM headers are aligned. In other words, after S109 is performed, an AM header in each fifth data stream of the M fifth data streams is located in data in the M fifth data streams, where the data is transmitted in a same clock cycle under driving of a clock signal sent by the third clock.

S110. Perform a fourth operation on the N fourth data streams to obtain N sixth data streams, where N AM headers of the N sixth data streams are aligned.

Specifically, alignment of the AM headers means that LSBs in the AM headers are aligned. In other words, after S110 is performed, an AM header in each sixth data stream of the N sixth data streams is located in data in the N sixth data streams, where the data is transmitted in a same clock cycle under driving of a clock signal sent by the third clock.

Specifically, before the third operation is performed, data including an AM header and transmitted in the M third data streams may belong to data transmitted in different clock cycles. After the third operation is performed, data, which includes an AM header, in the M fifth data streams is transmitted in a same clock cycle. Therefore, the M AM headers of the M fifth data streams transmitted in a same clock cycle are aligned. Similarly, before the fourth operation is performed, data including an AM header and transmitted in the N fourth data streams may belong to data transmitted in different clock cycles. After the fourth operation is performed, data, which includes an AM header, in the N sixth data streams is transmitted in a same clock cycle. Therefore, the N AM headers of the N sixth data streams transmitted in a same clock cycle are aligned.

Figure 4:
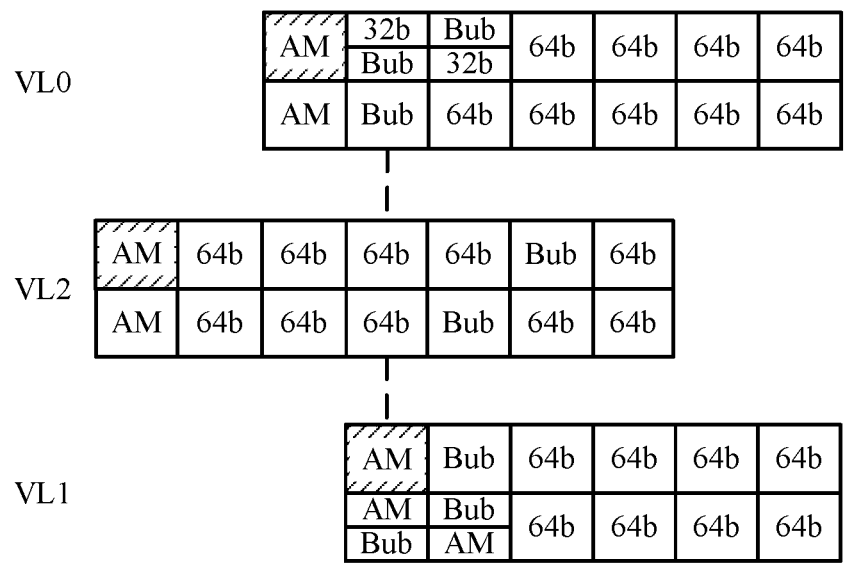
FIG. 4 is a schematic pattern diagram of data before and after a third operation is performed according to an embodiment of the present invention.
Figure 4:
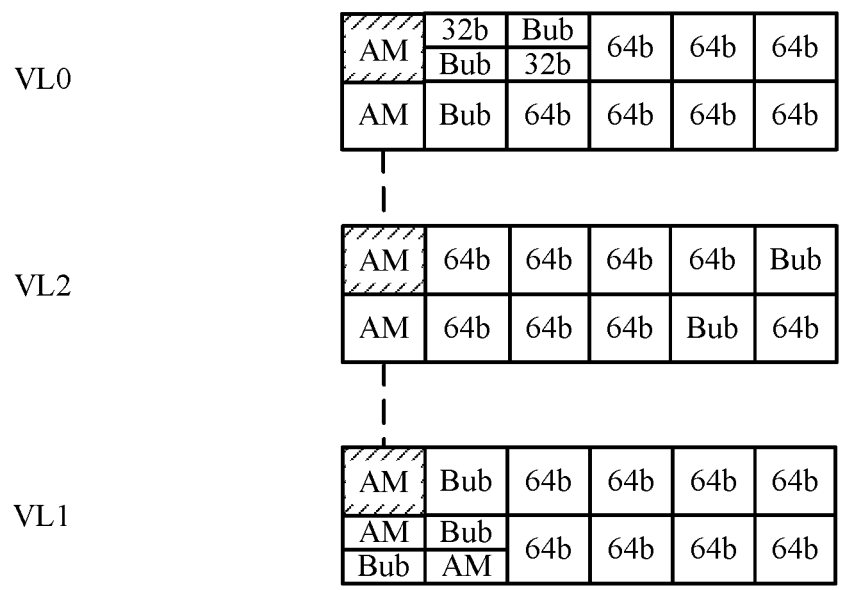
Figure 4:

FIG. 4 is a schematic pattern diagram of data before and after a third operation is performed. As shown in FIG. 4, before the third operation is performed, three pieces of data in three virtual lanes are staggered from each other. For example, at a time point when an AM header is transmitted on a virtual lane 1 (VL1), non-AM data is transmitted on both a virtual lane 0 (VL0) and a virtual lane 2 (VL2). AM headers of data streams on three virtual lanes are not transmitted in a same clock cycle. In other words, the three AM headers on the three virtual lanes are not aligned. After the third operation is performed, the AM headers of the three pieces of data in the three virtual lanes are aligned. That is, the three AM headers are transmitted in a same clock cycle. It can be seen from FIG. 4 that when an AM header is transmitted on the virtual lane 0 (VL0), an AM header is also transmitted on other virtual lanes. Because in the first operation, an AM header is set in a header position of data transmitted in one clock cycle, a header of each piece of data in the three pieces of data transmitted on the three virtual lanes is an AM header. Therefore, a time point for transmitting the AM headers in the three pieces of data is also the same, that is, the AM headers are aligned.

A specific implementation of the fourth operation may be similar to a specific implementation of the third operation. For the fourth operation, refer to FIG. 4 and related descriptions of FIG. 4.

Optionally, in the method shown in FIG. 1, S111 may be further performed after S109. S112 may be further performed after S110.

S111 and S112 may be performed after S109, or may be performed after the AM header adjustment (namely, S107) and the bandwidth adjustment operation (namely, S103) are implemented and before a descrambling operation (namely, S117) is performed. S112 may be performed after S110, or may be performed after the AM header adjustment (namely, S108) and the bandwidth adjustment operation (namely, S104) are implemented and before a descrambling operation (namely, S118) is performed.

S111. Perform a virtual lane reordering operation on the M third data streams.

Specifically, the M third data streams are arranged according to a sequence of lane numbers of corresponding M virtual lanes.

S112. Perform a virtual lane reordering operation on the N fourth data streams.

Specifically, the N fourth data streams are arranged according to a sequence of lane numbers of corresponding N virtual lanes.

Figure 5:
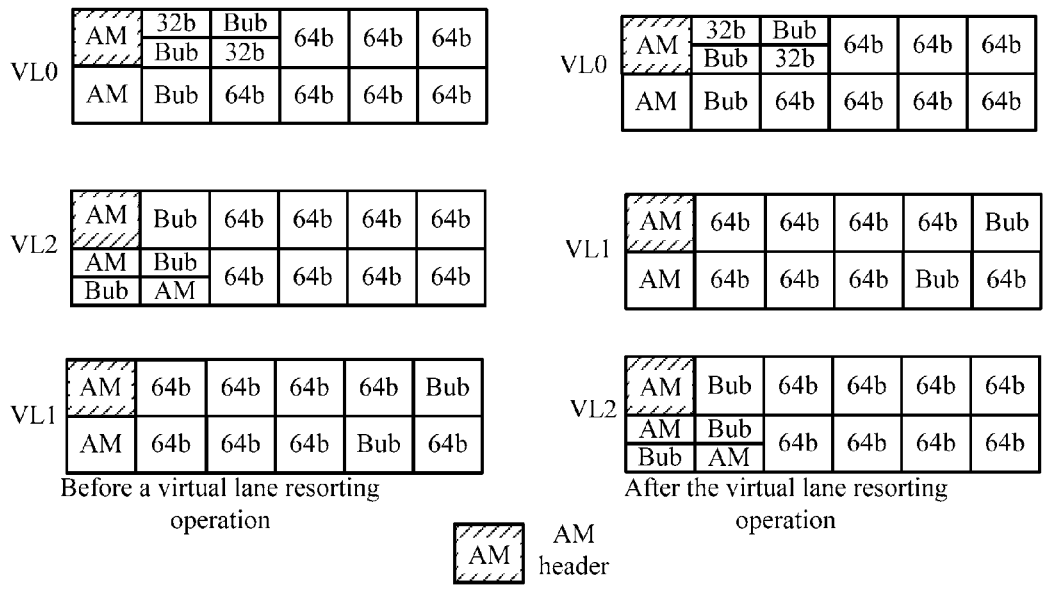
FIG. 5 is a schematic diagram of data before and after a virtual lane reordering operation is performed according to an embodiment of the present invention.

FIG. 5 is a schematic diagram of data before and after a virtual lane reordering operation is performed. It can be seen that before the virtual lane reordering operation is performed, three data streams are sequentially VL0, VL2, and VL1 from top to bottom. After reordering is performed according to lane numbers of the virtual lanes, the three data streams are sequentially VL0, VL1, and VL2 from top to bottom.

Optionally, in the method shown in FIG. 1, S113 may be further performed after S109. S114 may be further performed after S110.

S113. Perform a fifth operation on the M fifth data streams to obtain M seventh data streams, where data block groups in the M seventh data streams are aligned.

Optionally, S113 may also be performed after S109 and before S111.

S114. Perform a sixth operation on the N sixth data streams to obtain N eighth data streams, where data block groups in the N eighth data streams are aligned.

Optionally, S114 may also be performed after S110 and before S112.

For the data block groups in the M seventh data streams, a data block group in each seventh data stream includes an AM and Z data blocks. The Z data blocks include the $1^{st}$ data block to the $Z^{th}$ data block. A time sequence for transmitting the Z data blocks is sequentially from the $1^{st}$ data block to the $Z^{th}$ data block. If all data blocks with a same number in the M seventh data streams are transmitted in a same clock cycle, it may be considered that data block groups in the M seventh data streams are aligned. For example, M $1^{st}$ data blocks in the M seventh data streams are all transmitted in a same clock cycle. M $2^{nd}$ data blocks in the M seventh data streams are all transmitted in a same clock cycle. M $Z^{th}$ data blocks in the M seventh data streams are all transmitted in a same clock cycle. Z is an integer greater than 1. For example, Z may be equal to 16383.

For the data block groups in the N eighth data streams, a data block group in each eighth data stream includes an AM and Z data blocks. The Z data blocks include the $1^{st}$ data block to the $Z^{th}$ data block. A time sequence for transmitting the Z data blocks is sequentially from the $1^4$ data block to the $Z^{th}$ data block. If all data blocks with a same number in the N eighth data streams are transmitted in a same clock cycle, it may be considered that data block groups in the N eighth data streams are aligned. For example, N $1^{st}$ data blocks in the N eighth data streams are all transmitted in a same clock cycle. N $2^{nd}$ data blocks in the N eighth data streams are all transmitted in a same clock cycle. N $Z^{th}$ data blocks in the N eighth data streams are all transmitted in a same clock cycle.

Specifically, the fifth operation may be implemented by performing an operation on a FIFO buffer. Specifically, by using any data stream of the M fifth data streams as an example, if there are an AM data block and padding data when a write operation is performed on the FIFO buffer, the AM data block and the padding data are not written into the FIFO buffer. When a read operation is performed on a FIFO buffer, if one FIFO buffer is empty in a current clock cycle, padding data of one clock cycle is used as an output in the current clock cycle. A quantity of bits of the padding data is equal to a quantity of bits of an AM. In other words, the M fifth data streams correspond to one FIFO buffer group, where the FIFO buffer group includes $\partial *m$ FIFO buffers, and one data stream of the M fifth data streams correspond to $\partial$ FIFO buffers, where $\partial$ is a positive integer. If there is no to-be-read data in one FIFO buffer of the FIFO buffer group, data in all the FIFO buffers of the FIFO buffer group is not read. In this case, the padding data is used as output data. If there is to-be-read data in all the FIFO buffers of the FIFO buffer group, data is read from each FIFO buffer of the FIFO buffer group.

Figure 6:
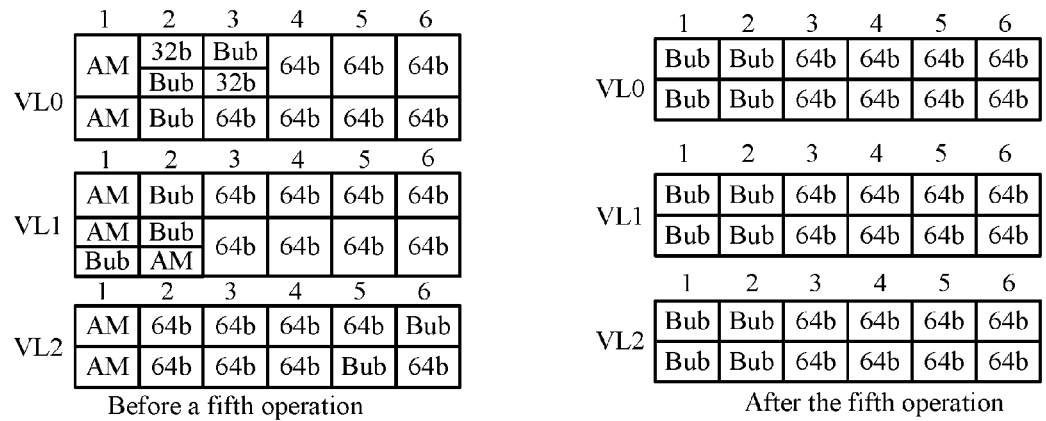
FIG. 6 is a schematic diagram of data before and after a fifth operation is performed according to an embodiment of the present invention.

FIG. 6 is a schematic diagram of data before and after a fifth operation is performed. 1-6 represent six consecutive clock cycles. A time sequence of the six consecutive clock cycles is sequentially from a clock cycle 1 to a clock cycle 6. As shown in FIG. 6, before the fifth operation is performed, data block groups in three data streams are staggered from each other, and padding data is inserted between data blocks. For example, in a clock cycle with a clock cycle number of 2, data transmitted on a VL0 includes a data subblock of padding data and a data subblock of a data block. Data transmitted on a VL1 includes a data subblock of padding data and a data subblock of an AM. Data transmitted on a VL2 is a data block. After the fifth operation is performed, all data blocks of each data stream in the first two clock cycles are padding data, and all data transmitted in a clock cycle after the first two clock cycles is data block groups. For example, all data transmitted on the VL0 to the VL2 in a clock cycle with a clock cycle number of 2 is padding data. All data transmitted on the VL0 to the VL2 in clock cycles with clock cycle numbers of 3 to 6 is data block groups.

A specific implementation of the sixth operation may be similar to a specific implementation of the fifth operation. For the sixth operation, refer to FIG. 6 and related descriptions of FIG. 6.

Further, as an embodiment, S115 may be further performed after S113 is performed, and S116 may be further performed after S114 is performed.

S115. Perform descrambling on the M seventh data streams to obtain a first Ethernet frame flow.

S116. Perform descrambling on the N eighth data streams to obtain a second Ethernet frame flow.

Further, as an embodiment, S117 may be further performed after S115 and S116 are performed.

S117. Under driving of a clock signal sent by the third clock, converge the first Ethernet frame flow and the second Ethernet frame flow to obtain an Ethernet frame flow.

Further, as an embodiment, the following steps may be further included.

S120. Decode the Ethernet frame flow to obtain the decoded Ethernet frame flow.

For example, S120 may be executed by a physical coding sublayer (physical coding sublayer, PCS for short). The decoding may be 66b/64b decoding.

S121. Perform media access control sublayer (media access control sublayer) processing on the decoded Ethernet frame flow to obtain the processed Ethernet frame flow.

For example, S121 may be executed by a MAC.

S122. Send the Ethernet frame flow that undergoes the media access control sublayer processing to a network processor (network processor, NP for short).

In this way, data streams included in the Ethernet frame flow that is obtained by the network processor by means of the foregoing processing are synchronous, and the data streams are driven, by using a same clock, for transmission. The network processor may process data streams of different sources and different frequencies in a manner same as that of processing data streams of a same source and a same frequency.

A person of ordinary skill in the art may realize that by combining the embodiments disclosed in this specification, any two data streams of data streams sent by a plurality of senders and received from an Ethernet interface may be processed by using the method disclosed in this embodiment of the present invention, so as to obtain synchronous data streams.

Figure 7:
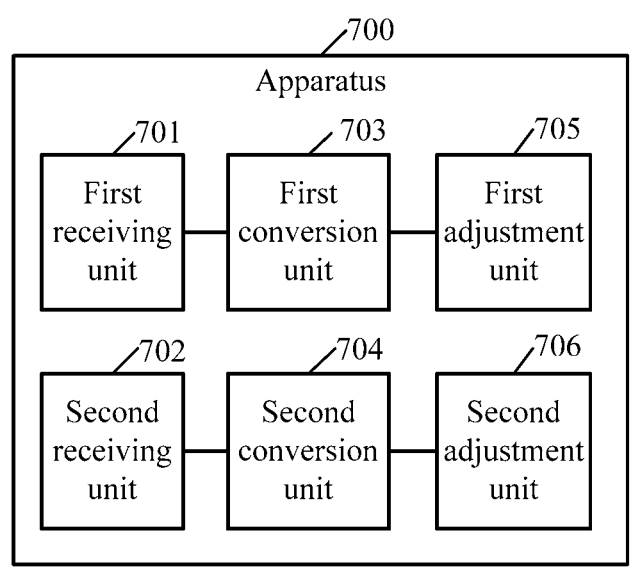
FIG. 7 is a schematic structural diagram of a data processing apparatus according to an embodiment of the present invention.
Figure 8:
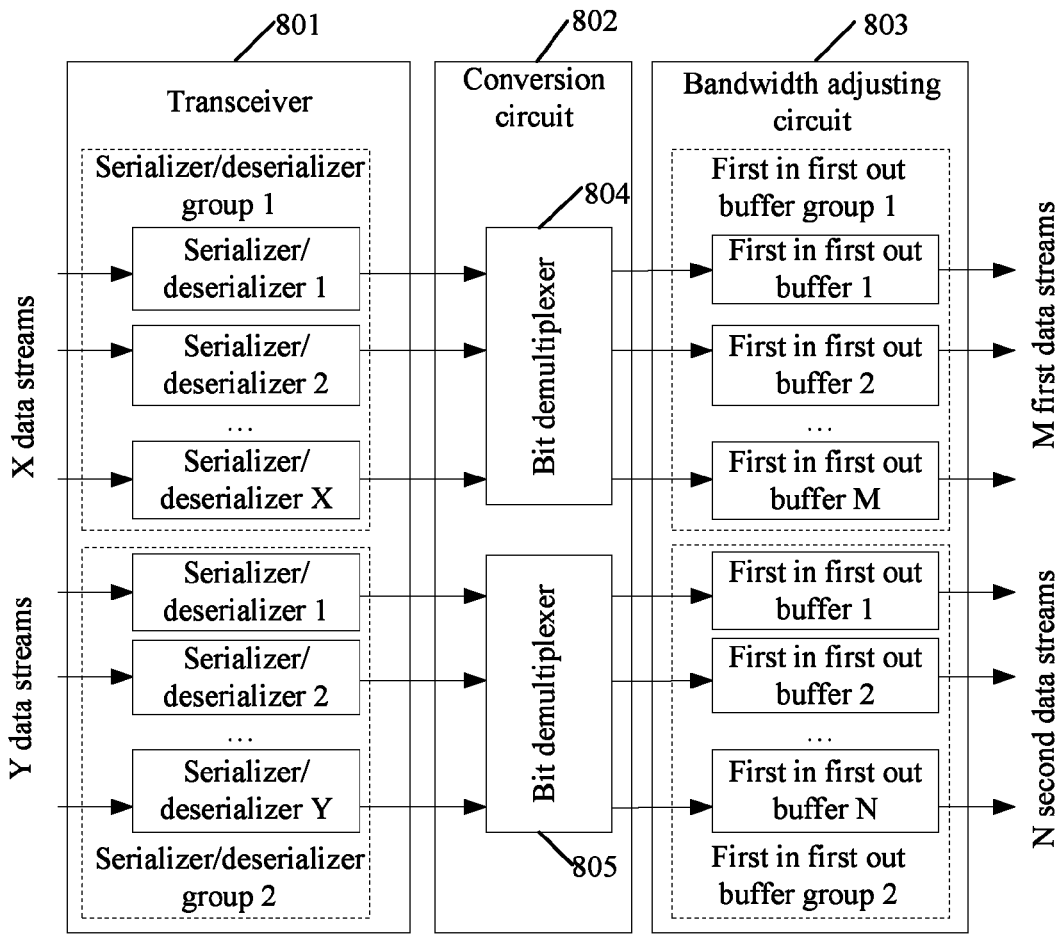
FIG. 8 is a schematic structural diagram of a data processing apparatus according to an embodiment of the present invention.

FIG. 7 is a schematic structural diagram of a data processing apparatus according to an embodiment of the present invention. The apparatus may be configured to execute the method shown in FIG. 1 or FIG. 2. The apparatus may be a PHY, a PHY chip, a system on chip or a multiport Ethernet device. FIG. 8 is a schematic structural diagram of a data processing apparatus according to an embodiment of the present invention. An apparatus 700 shown in FIG. 7 may be implemented by using the apparatus shown in FIG. 8. Referring to FIG. 7, the apparatus includes: a first receiving unit 701, a first conversion unit 703, a first adjustment unit 705, a second receiving unit 704, a second conversion unit 706, and a second adjustment unit 708.

The first receiving unit 701 is configured to receive X data streams through X physical lanes of an Ethernet interface, where the X data streams are sent by a first sender under driving of a first clock, the X physical lanes are in a one-to-one correspondence with the X data streams, and X is a positive integer.

Referring to FIG. 8, the first receiving unit 701 may be implemented by using a transceiver (transceiver) 801. Specifically, the first receiving unit 701 may be implemented by using a serializer/deserializer group 1 in the transceiver 801. The serializer/deserializer group 1 includes a serializer/deserializer 1, a serializer/deserializer 2 . . . and a serializer/deserializer X. The serializer/deserializer 1 to the serializer/deserializer X are in a one-to-one correspondence with the X physical lanes. The serializer/deserializer 1 to the serializer/deserializer X are in a one-to-one correspondence with the X data streams.

The first conversion unit 703 is configured to convert the X data streams received by the first receiving unit 701 into M data streams transmitted on M virtual lanes, where the M data streams are in a one-to-one correspondence with the M virtual lanes, and M is a positive integer.

Referring to FIG. 8, the first conversion unit 703 may be implemented by using a conversion circuit 802, specifically, may be implemented by using a bit demux 804. Certainly, when X is equal to M, the first conversion unit 703 may also be implemented by using a transmission medium. Referring to FIG. 8, data output by the bit demux 804 is the M data streams.

The first adjustment unit 705 is configured to perform bandwidth adjustment on each data stream of the M data streams obtained by the first conversion unit 703 to obtain M first data streams, where the M first data streams are in a one-to-one correspondence with the M data streams, and bandwidth of each first data stream of the M first data streams is greater than bandwidth of a data stream of the corresponding M data streams.

Referring to FIG. 8, the first adjustment unit 705 may be implemented by using a bandwidth adjusting circuit 803, specifically, may be implemented by using a FIFO buffer group 1. Referring to FIG. 8, data output by the FIFO buffer group 1 is the M first data streams. The FIFO buffer group 1 includes FIFO 1, FIFO 2 . . . and FIFO M. The FIFO 1 to the FIFO M are in a one-to-one correspondence with the M data streams. A frequency at which a write operation is performed on the FIFO buffer group 1 is equal to a frequency of the first clock. A read operation on the FIFO buffer group 1 is performed under the driving of the third clock. A frequency at which a read operation is performed on the FIFO buffer group 1 is equal to a frequency of the third clock.

The second receiving unit 702 is configured to receive Y data streams through Y physical lanes of the Ethernet interface, where any physical lane of the X physical lanes is different from any physical lane of the Y physical lanes, the Y data streams are sent by a second sender under driving of a second clock, the Y physical lanes are in a one-to-one correspondence with the Y data streams, Y is a positive integer, a nominal working frequency of the first clock is equal to a nominal working frequency of the second clock, and an actual working frequency of the first clock is not equal to an actual working frequency of the second clock.

Referring to FIG. 8, the second receiving unit 702 may be implemented by using a transceiver (transceiver) 801. Specifically, the second receiving unit 702 may be implemented by using a serializer/deserializer group 1 in the transceiver 801. The serializer/deserializer group 1 includes a serializer/deserializer 1, a serializer/deserializer 2 . . . and a serializer/deserializer Y. The serializer/deserializer 1 to the serializer/deserializer Y are in a one-to-one correspondence with the Y physical lanes. The serializer/deserializer 1 to the serializer/deserializer Y are in a one-to-one correspondence with the Y data streams.

The second conversion unit 704 is configured to convert the Y data streams received by the second receiving unit 702 into N data streams transmitted on N virtual lanes, where the N data streams are in a one-to-one correspondence with the N virtual lanes, and both each data stream of the M data streams and each data stream of the N data stream include an alignment mark AM and a data block group, where the AM is an immediate previous data block of the data block group, a quantity of bits included in the data block group is equal to a positive integer multiple of a quantity of bits included in the AM, and N is a positive integer.

Referring to FIG. 8, the second conversion unit 704 may be implemented by using a conversion circuit 802, specifically, may be implemented by using a bit demux 805. Certainly, when Y is equal to N, the second conversion unit 704 may also be implemented by using a transmission medium. Referring to FIG. 8, data output by the bit demux 805 is the N data streams.

For example, a quantity of bits included in each data block in the data block group is equal to the quantity of bits included in the AM. In addition, the AM is also a data block.

The following describes a data block in a data stream. Each data block in the data stream is obtained by performing physical layer coding on an Ethernet frame flow. The physical layer coding may be 8 bit/10 bit coding, or may be 64 bit/66 bit coding. When the physical layer coding is 8 bit/10 bit coding, a quantity of bits included in one data block is 10. When the physical layer coding is 64 bit/66 bit coding, a quantity of bits included in one data block is 66. In a 66-bit data block, two bits may be a synchronization header. The 64-bit data block in this embodiment of the present invention refers to a data block excluding a synchronization header. In addition, after a data block is generated, the data block needs to be distributed to a virtual lane. In one clock cycle, one data block may be distributed to a virtual lane, or two data blocks may be distributed to a virtual lane. Therefore, for one virtual lane, a quantity of bits of data transmitted in one clock cycle is equal to 128.

Because the quantity of bits of the data transmitted in one clock cycle is equal to a quantity of bits of one data block, a quantity of bits of a data block transmitted on the virtual lane may be 128. The AM is a type of data block. Therefore, a quantity of bits of an AM transmitted on the virtual lane may also be 128.

After physical layer coding is performed on the Ethernet frame flow, an AM is inserted periodically. This cycle may be referred to as a data cycle. For example, according to a 100 GE standard in the IEEE802.3ba, data transmitted in one data cycle may be 16384 data blocks. The 16384 data blocks include an AM and 16383 data blocks. The AM is transmitted before the 16383 data blocks. A quantity of bits included in each data block of the 16384 data blocks is 64. That is, in common cases, data transmitted in one data cycle includes one AM and a plurality of data blocks, where the plurality of data blocks forms a data block group. In other words, after an AM is inserted, data blocks, except the AM, in the data transmitted in one data cycle are data blocks in the data block group. In the data transmitted in one data cycle, a quantity of bits included in each data block of the plurality of data blocks is equal to a quantity of bits included in the AM.

The second adjustment unit 706 is configured to perform bandwidth adjustment on each data stream of the N data streams obtained by the second conversion unit 704 to obtain N second data streams, where the N second data streams are in a one-to-one correspondence with the N data streams, the M first data streams and the N second data streams are transmitted under driving of a third clock, and bandwidth of each second data stream of the N second data streams is greater than bandwidth of a data stream of the corresponding N data streams.

Referring to FIG. 8, the second adjustment unit 706 may be implemented by using a bandwidth adjusting circuit 803, specifically, may be implemented by using a FIFO buffer group 2. Referring to FIG. 8, data output by the FIFO buffer group 2 is the N second data streams. The FIFO buffer group 2 includes FIFO 1, FIFO 2 . . . and FIFO N. The FIFO 1 to the FIFO N are in a one-to-one correspondence with the N data streams. A frequency at which a write operation is performed on the FIFO buffer group 2 is equal to a frequency of the second clock. A read operation on the FIFO buffer group 2 is performed under the driving of the third clock. A frequency at which a read operation is performed on the FIFO buffer group 2 is equal to a frequency of the third clock.

According to the foregoing technical solution, M first data streams and N second data streams that are located in a same clock domain can be generated. Therefore, subsequent processing can be conveniently performed on the M first data streams and the N second data streams that are located in a same clock domain.

For the first adjustment unit 705, the performing bandwidth adjustment on each data stream of the M data streams to obtain M first data streams may be implemented by adjusting a frequency and/or a bit width. Bandwidth of a data stream is related to a frequency of a driving clock of the data stream, and is also related to a bit width of the data stream. Specifically, the bandwidth of the data stream satisfies formula 1.1:

$$B=F*b \qquad \text{formula 1.1}$$

where B represents the bandwidth of the data stream, F represents the frequency of the driving clock of the data stream, and b represents the bit width of the data stream. Similarly, for S106, the performing bandwidth adjustment on each data stream of the N data streams to obtain N second data streams may also be implemented by adjusting a frequency and/or a bit width.

The bandwidth adjustment may be implemented by performing a write operation and a read operation on a first in first out (First In First Out, FIFO for short) buffer. Using the M data streams as an example, the M data streams may be separately written into M first in first out (FIFO) buffers, and then a read operation is performed on the M FIFO buffers, where the M FIFO buffers are in a one-to-one correspondence with the M data streams. A frequency at which a write operation is performed on the M FIFO buffers may be a frequency of the first clock, and a frequency at which a read operation is performed on the M FIFO buffers may be a frequency of the third clock. A data bit width for performing a read operation on a FIFO buffer may be greater than a data bit width for performing a write operation on the FIFO buffer. If the bandwidth adjustment is implemented by adjusting only the frequency, but not adjusting the bit width, the frequency of the third clock is greater than the frequency of the first clock. If the bandwidth adjustment is implemented by adjusting both the frequency and the bit width, the frequency of the third clock may be less than or equal to the frequency of the first clock. In this case, bandwidth for reading the FIFO buffer is greater than bandwidth for writing the FIFO buffer.

Similarly, for the second adjustment unit 706, the N data streams may also be separately written into the N first in first out (FIFO) buffers, and then a read operation is performed on the N FIFO buffers. The N FIFO buffers are in a one-to-one correspondence with the N data streams. A frequency at which a write operation is performed on the N FIFO buffers may be a frequency of the second clock, and a frequency at which a read operation is performed on the N FIFO buffers may be a frequency of the third clock. If the bandwidth adjustment is implemented by adjusting only the frequency and the bit width remains unchanged, the frequency of the third clock is greater than the frequency of the first clock. If the bandwidth adjustment is implemented by adjusting both the frequency and the bit width, the frequency of the third clock may be less than or equal to the frequency of the first clock. In this case, bandwidth for reading the FIFO buffer is greater than bandwidth for writing the FIFO buffer.

In a case in which bandwidth for reading a FIFO buffer is greater than bandwidth for writing a FIFO buffer, when a read operation is performed on a FIFO buffer, an amount of data in the FIFO buffer cannot meet a requirement of reading data at the frequency of the third clock. In other words, in one clock cycle, an amount of data read at the frequency of the third clock is greater than an amount of data written at the frequency of the first clock. In this case, reading the FIFO buffer needs to be stopped, and padding data is used as data output by the FIFO buffer, so as to prevent underflow of the FIFO buffer. Using the padding data as the data output by the FIFO buffer is equivalent to adding the padding data to the read data. An amount of padding data which is added to data streams read in one clock cycle is equal to a quantity of bits of one AM. Data added with the padding data is a first data stream corresponding to the data streams written into the FIFO buffer.

In this embodiment of the present invention, a format of padding data added by the first adjustment unit 705 and the second adjustment unit 706 is not limited. When the padding data is inserted into a data stream, the padding data may be marked, so that the padding data is deleted subsequently.

Optionally, the apparatus shown in FIG. 7 may further include a first unit, a second unit, a third unit, a fourth unit, a fifth unit, a sixth unit, a seventh unit, an eighth unit, and a ninth unit. For descriptions of the first unit to the ninth unit, refer to the description of the embodiment shown in FIG. 9.

Figure 9:
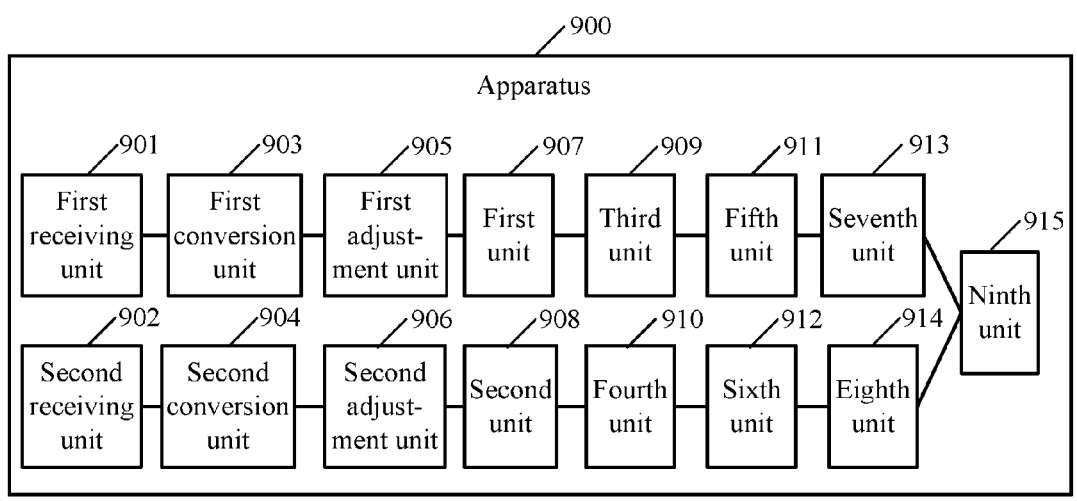
FIG. 9 is a schematic structural diagram of another data processing apparatus according to an embodiment of the present invention.

FIG. 9 is a schematic structural diagram of another data processing apparatus according to an embodiment of the present invention. An apparatus 900 shown in FIG. 9 can execute the method shown in FIG. 1 or FIG. 2.

A first receiving unit 901 in the apparatus 900 has a same function as the first receiving unit 701 in the apparatus 700; a second receiving unit 902 in the apparatus 900 has a same function as the second receiving unit 702 in the apparatus 700; a first conversion unit 903 in the apparatus 900 has a same function as the first conversion unit 703 in the apparatus 700; a second conversion unit 904 in the apparatus 900 has a same function as the second conversion unit 704 in the apparatus 700; a first adjustment unit 905 in the apparatus 900 has a same function as the first adjustment unit 705 in the apparatus 700; and a second adjustment unit 906 in the apparatus 900 has a same function as the second adjustment unit 706 in the apparatus 700. Because these units have the same functions, details are not repeatedly described herein.

The apparatus 900 may further include a first unit 907 and a second unit 908.

The first unit 907 is configured to perform a first operation on each first data stream of the M first data streams obtained by the first adjustment unit 905 to obtain M third data streams, where the M third data streams are in a one-to-one correspondence with the M first data streams, an AM header of each third data stream is a header of data of the third data stream, where the data subblock is transmitted in one clock cycle under the driving of the third clock, and the AM header of each third data stream is an AM of a corresponding first data stream or a data subblock in an AM of a corresponding first data stream, where the data subblock includes a least significant bit LSB of the AM.

For example, the first unit 907 may be implemented by using a temporal logic circuit.

The second unit 908 is configured to perform a second operation on each second data stream of the N second data streams obtained by the second adjustment unit 906 to obtain N fourth data streams, where the N fourth data streams are in a one-to-one correspondence with the N second data streams, an AM header of each fourth data stream is a header of data of the fourth data stream, where the data is transmitted in one clock cycle under the driving of the third clock, and the AM header of each fourth data stream is an AM of a corresponding second data stream or a data subblock in an AM of a corresponding second data stream, where the data subblock includes a least significant bit LSB of the AM.

For example, the second unit 908 may be implemented by using a temporal logic circuit.

For example, when the first operation is performed, the AM header may be first identified, and then the AM header is adjusted to a header of data transmitted in one clock cycle. That is, the first operation may include two operations: an operation of identifying the AM header and an operation of adjusting the AM header.

For example, when the second operation is performed, the AM header may be first identified, and then the AM header is adjusted to a header of data transmitted in one clock cycle. That is, the second operation may include two operations: an operation of identifying the AM header and an operation of adjusting the AM header.

A person of ordinary skill in the art can understand that a complete AM includes an LSB. When the AM is transmitted, the LSB in the AM is first transmitted. Therefore, an AM header includes an LSB of a corresponding AM. The AM header may be a complete AM, or may be a data subblock, which includes an LSB of an AM, in a complete AM. For example, a complete AM may be divided into K data subblocks, such as an AM_1 to an AM_K, where K is a positive integer greater than 2. The first AM subblock (namely, the AM_1) of the K AM subblocks includes an LSB. In this case, the AM_1 may be referred to as an AM header.

The apparatus 900 may further include a third unit 909 and a fourth unit 910.

The third unit 909 is configured to perform a third operation on the M third data streams obtained by the first unit 907 to obtain M fifth data streams, where M AM headers of the M fifth data streams are aligned.

For example, the third unit 909 may be implemented by using a temporal logic circuit.

The fourth unit 910 is configured to perform a fourth operation on the N fourth data streams obtained by the second unit 908 to obtain N sixth data streams, where N AM headers of the N sixth data streams are aligned.

For example, the fourth unit 910 may be implemented by using a temporal logic circuit.

Specifically, alignment of the AM headers means that LSBs in the AM headers are aligned. In other words, an AM header in each fifth data stream of the M fifth data streams is located in data in the M fifth data streams, where the data is transmitted in a same clock cycle under driving of a clock signal sent by the third clock.

Specifically, alignment of the AM headers means that LSBs in the AM headers are aligned. In other words, an AM header in each sixth data stream of the N sixth data streams is located in data in the N sixth data streams, where the data is transmitted in a same clock cycle under driving of a clock signal sent by the third clock.

The apparatus 900 may further include a fifth unit 911 and a sixth unit 912.

The fifth unit 911 is configured to perform a fifth operation on the M fifth data streams obtained by the third unit 909 to obtain M seventh data streams, where data block groups in the M seventh data streams are aligned.

For example, the fifth unit 911 may be implemented by using a temporal logic circuit.

The sixth unit 912 is configured to perform a sixth operation on the N sixth data streams obtained by the fourth unit 910 to obtain N eighth data streams, where data block groups in the N eighth data streams are aligned.

For example, the sixth unit 912 may be implemented by using a temporal logic circuit.

For the data block groups in the M seventh data streams, a data block group in each seventh data stream includes an AM and Z data blocks. The Z data blocks include the $1^{st}$ data block to the $Z^{th}$ data block. A time sequence for transmitting the Z data blocks is sequentially from the $1^{st}$ data block to the $Z^{th}$ data block. If all data blocks with a same number in the M seventh data streams are transmitted in a same clock cycle, it may be considered that data block groups in the M seventh data streams are aligned. For example, M $1^{st}$ data blocks in the M seventh data streams are all transmitted in a same clock cycle. M $2^{nd}$ data blocks in the M seventh data streams are all transmitted in a same clock cycle. M $Z^{th}$ data blocks in the M seventh data streams are all transmitted in a same clock cycle. Z is an integer greater than 1. For example, Z may be equal to 16383.

For the data block groups in the N eighth data streams, a data block group in each eighth data stream includes an AM and Z data blocks. The Z data blocks include the $1^{st}$ data block to the $Z^{th}$ data block. A time sequence for transmitting the Z data blocks is sequentially from the $1^{st}$ data block to the $Z^{th}$ data block. If all data blocks with a same number in the N eighth data streams are transmitted in a same clock cycle, it may be considered that data block groups in the N eighth data streams are aligned. For example, N $1^{st}$ data blocks in the N eighth data streams are all transmitted in a same clock cycle. N $2^{nd}$ data blocks in the N eighth data streams are all transmitted in a same clock cycle. N $Z^{th}$ data blocks in the N eighth data streams are all transmitted in a same clock cycle.

Specifically, the fifth operation may be implemented by performing an operation on a FIFO buffer. Specifically, by using any data stream of the M fifth data streams as an example, if there are an AM data block and padding data when a write operation is performed on the FIFO buffer, the AM data block and the padding data are not written into the FIFO buffer. When a read operation is performed on a FIFO buffer, if one FIFO buffer is empty in a current clock cycle, padding data of one clock cycle is used as an output in the current clock cycle. A quantity of bits of the padding data is equal to a quantity of bits of an AM. In other words, the M fifth data streams correspond to one FIFO buffer group, where the FIFO buffer group includes ∂*m FIFO buffers, and one data stream of the M fifth data streams correspond to ∂ FIFO buffers, where ∂ is a positive integer. If there is no to-be-read data in one FIFO buffer of the FIFO buffer group, data in all the FIFO buffers of the FIFO buffer group is not read. In this case, the padding data is used as output data. If there is to-be-read data in all the FIFO buffers of the FIFO buffer group, data is read from each FIFO buffer of the FIFO buffer group.

A specific implementation of the sixth operation may be similar to a specific implementation of the fifth operation. For the sixth operation, refer to related descriptions of the fifth operation.

The apparatus 900 may further include a seventh unit 913 and an eighth unit 914.

The seventh unit 913 is configured to perform descrambling on the M seventh data streams obtained by the fifth unit 911 to obtain a first Ethernet frame flow.

For example, the seventh unit may be implemented by using a descrambler.

The eighth unit 914 is configured to perform descrambling on the N eighth data streams obtained by the sixth unit 912 to obtain a second Ethernet frame flow.

For example, the eighth unit may be implemented by using a descrambler.

The apparatus 900 may further include:

a ninth unit 915, configured to: under driving of a clock signal sent by the third clock, converge the first Ethernet frame flow generated by the seventh unit 913 and the second Ethernet frame flow generated by the eighth unit 914 to obtain an Ethernet frame flow.

For example, the ninth unit 915 may be implemented by using a convergence circuit.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of the present invention, but are not intended to limit the protection scope of the present invention. Any variation or replacement readily figured out by a person skilled in the art in the technical scope disclosed in the present invention shall fall in the protection scope of the present invention. Therefore, the protection scope of the present invention shall be subject to the protection scope of the claims.

What is claimed is:

1. A data processing method, comprising:
receiving X data streams through X physical lanes of an Ethernet interface, wherein the X data streams are sent by a first sender under driving of a first clock, the X physical lanes are in a one-to-one correspondence with the X data streams, and X is a positive integer;

converting the X data streams into M data streams transmitted on M virtual lanes, wherein the M data streams are in a one-to-one correspondence with the M virtual lanes, and M is a positive integer;

performing bandwidth adjustment on each data stream of the M data streams to obtain M first data streams, wherein the M first data streams are in a one-to-one correspondence with the M data streams, and bandwidth of each first data stream of the M first data streams is greater than bandwidth of a data stream of the corresponding M data streams;

receiving Y data streams through Y physical lanes of the Ethernet interface, wherein any physical lane of the X physical lanes is different from any physical lane of the Y physical lanes, the Y data streams are sent by a second sender under driving of a second clock, the Y physical lanes are in a one-to-one correspondence with the Y data streams, Y is a positive integer, a nominal working frequency of the first clock is equal to a nominal working frequency of the second clock, and an actual working frequency of the first clock is not equal to an actual working frequency of the second clock;

converting the Y data streams into N data streams transmitted on N virtual lanes, wherein the N data streams are in a one-to-one correspondence with the N virtual lanes, and both each data stream of the M data streams and each data stream of the N data stream comprise an alignment mark AM and a data block group, wherein the AM is an immediate previous data block of the data block group, a quantity of bits comprised in the data block group is equal to a positive integer multiple of a quantity of bits comprised in the AM, and N is a positive integer; and performing bandwidth adjustment on each data stream of the N data streams to obtain N second data streams, wherein the N second data streams are in a one-to-one correspondence with the N data streams, the M first data streams and the N second data streams are transmitted under driving of a third clock, and bandwidth of each second data stream of the N second data streams is greater than bandwidth of a data stream of the corresponding N data streams.

2. The method according to claim 1, wherein:

after the performing bandwidth adjustment on each data stream of the M data streams to obtain M first data streams, the method further comprises:

performing a first operation on each first data stream of the M first data streams to obtain M third data streams, wherein the M third data streams are in a one-to-one correspondence with the M first data streams, an AM header of each third data stream is a header of data of the third data stream, wherein the data is transmitted in one clock cycle under the driving of the third clock, and the AM header of each third data stream is an AM of a corresponding first data stream or a data subblock in an AM of a corresponding first data stream, wherein the data subblock comprises a least significant bit (LSB) of the AM; and after the performing bandwidth adjustment on each data stream of the N data streams to obtain N second data streams, the method further comprises:

performing a second operation on each second data stream of the N second data streams to obtain N fourth data streams, wherein the N fourth data streams are in a one-to-one correspondence with the N second data streams, an AM header of each fourth data stream is a header of data of the fourth data stream, wherein the data is transmitted in one clock cycle under the driving of the third clock, and the AM header of each fourth data stream is an AM of a corresponding second data stream or a data subblock in an AM of a corresponding second data stream, wherein the data subblock comprises an LSB of the AM.

3. The method according to claim 2, wherein after the performing a first operation on each first data stream of the M first data streams to obtain M third data streams, the method further comprises:

performing a third operation on the M third data streams to obtain M fifth data streams, wherein M AM headers of the M fifth data streams are aligned; and after the performing a second operation on each second data stream of the N second data streams to obtain N fourth data streams, the method further comprises:

performing a fourth operation on the N fourth data streams to obtain N sixth data streams, wherein N AM headers of the N sixth data streams are aligned.

4. The method according to claim 3, wherein after the performing a third operation on the M third data streams to obtain M fifth data streams, the method further comprises:

performing a fifth operation on the M fifth data streams to obtain M seventh data streams, wherein data block groups in the M seventh data streams are aligned; and after the performing a fourth operation on the N fourth data streams to obtain N sixth data streams, the method further comprises:

performing a sixth operation on the N sixth data streams to obtain N eighth data streams, wherein data block groups in the N eighth data streams are aligned.

5. The method according to claim 4, wherein after the performing a fifth operation on the M fifth data streams to obtain M seventh data streams, the method further comprises:

performing descrambling on the M seventh data streams to obtain a first Ethernet frame flow; and after the performing a sixth operation on the N sixth data streams to obtain N eighth data streams, the method further comprises:

performing descrambling on the N eighth data streams to obtain a second Ethernet frame flow.

6. The method according to claim 5, wherein the method further comprises:

under driving of a clock signal sent by the third clock, converging the first Ethernet frame flow and the second Ethernet frame flow to obtain an Ethernet frame flow.

7. A data processing apparatus comprising a processor and a non-transitory computer readable medium containing instructions that when executed by the processor causes the processor to:

receive X data streams through X physical lanes of an Ethernet interface, wherein the X data streams are sent by a first sender under driving of a first clock, the X physical lanes are in a one-to-one correspondence with the X data streams, and X is a positive integer;

convert the X data streams into M data streams transmitted on M virtual lanes, wherein the M data streams are in a one-to-one correspondence with the M virtual lanes, and M is a positive integer;

perform bandwidth adjustment on each data stream of the M data streams to obtain M first data streams, wherein the M first data streams are in a one-to-one correspondence with the M data streams, and bandwidth of each first data stream of the M first data streams is greater than bandwidth of a data stream of the corresponding M data streams;

receive Y data streams through Y physical lanes of the Ethernet interface, wherein any physical lane of the X physical lanes is different from any physical lane of the Y physical lanes, the Y data streams are sent by a second sender under driving of a second clock, the Y physical lanes are in a one-to-one correspondence with the Y data streams, Y is a positive integer, a nominal working frequency of the first clock is equal to a nominal working frequency of the second clock, and an actual working frequency of the first clock is not equal to an actual working frequency of the second clock;

convert the Y data streams into N data streams transmitted on N virtual lanes, wherein the N data streams are in a one-to-one correspondence with the N virtual lanes, and both each data stream of the M data streams and each data stream of the N data stream comprise an alignment mark AM and a data block group, wherein the AM is an immediate previous data block of the data block group, a quantity of bits comprised in the data block group is equal to a positive integer multiple of a quantity of bits comprised in the AM, and N is a positive integer; and perform bandwidth adjustment on each data stream of the N data streams to obtain N second data streams, wherein the N second data streams are in a one-to-one correspondence with the N data streams, the M first data streams and the N second data streams are transmitted under driving of a third clock, and bandwidth of each second data stream of the N second data streams is greater than bandwidth of a data stream of the corresponding N data streams.

8. The apparatus according to claim 7, the processor is further configured to:

perform a first operation on each first data stream of the M first data streams to obtain M third data streams, wherein the M third data streams are in a one-to-one correspondence with the M first data streams, an AM header of each third data stream is a header of data of the third data stream, wherein the data is transmitted in a one clock cycle under the driving of the third clock, and the AM header of each third data stream is an AM of a corresponding first data stream or a data subblock in an AM of a corresponding first data stream, wherein the data subblock comprises a least significant bit (LSB) of the AM; and perform a second operation on each second data stream of the N second data streams to obtain N fourth data streams, wherein the N fourth data streams are in a one-to-one correspondence with the N second data streams, an AM header of each fourth data stream is a header of data of the fourth data stream, wherein the data is transmitted in a one clock cycle under the driving of the third clock, and the AM header of each fourth data stream is an AM of a corresponding second data stream or a data subblock in an AM of a corresponding second data stream, wherein the data subblock comprises a LSB of the AM.

9. The apparatus according to claim 8, the processor is further configured to:

perform a third operation on the M third data streams to obtain M fifth data streams, wherein M AM headers of the M fifth data streams are aligned; and perform a fourth operation on the N fourth data streams to obtain N sixth data streams, wherein N AM headers of the N sixth data streams are aligned.

10. The apparatus according to claim 9, the processor is further configured to:

perform a fifth operation on the M fifth data streams to obtain M seventh data streams, wherein data block groups in the M seventh data streams are aligned; and perform a sixth operation on the N sixth data streams to obtain N eighth data streams, wherein data block groups in the N eighth data streams are aligned.

11. The apparatus according to claim 10, the processor is further configured to:

perform descrambling on the M seventh data streams to obtain a first Ethernet frame flow; and perform descrambling on the N eighth data streams to obtain a second Ethernet frame flow.

12. The apparatus according to claim 11, the processor is further configured to:

under driving of a clock signal sent by the third clock, converge the first Ethernet frame flow and the second Ethernet frame flow to obtain an Ethernet frame flow.

* * * * *